July 24, 1962  F. S. JENNINGS, JR  3,045,950
HELICOPTER CONTROL SYSTEM
Filed Feb. 1, 1961
2 Sheets-Sheet 1

INVENTOR.
Frank S. Jennings, Jr.
BY
Hovey, Schmidt, Johnson & Hovey
ATTORNEYS.

July 24, 1962
F. S. JENNINGS, JR
3,045,950
HELICOPTER CONTROL SYSTEM
Filed Feb. 1, 1961
2 Sheets-Sheet 2
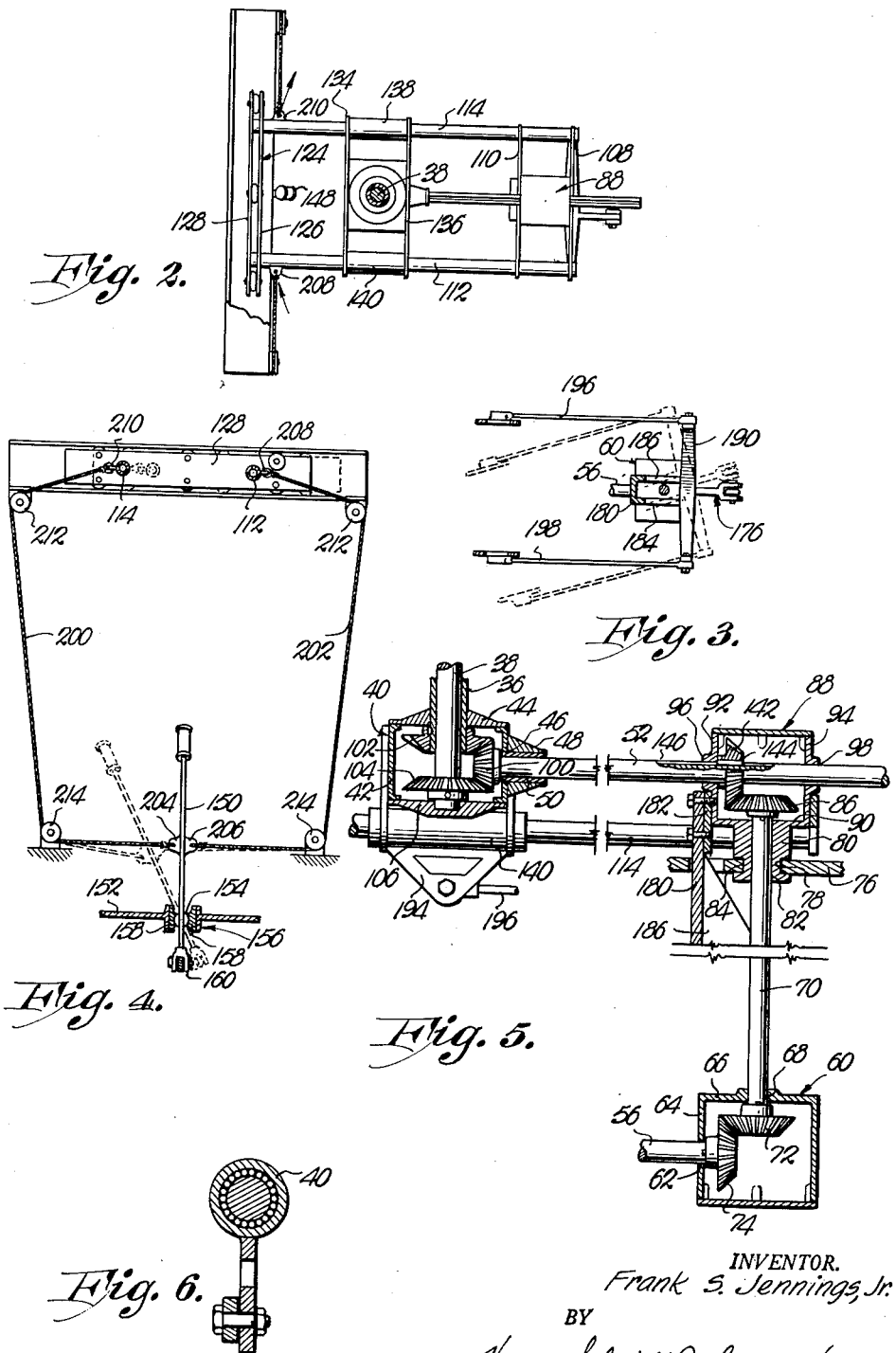
INVENTOR.
Frank S. Jennings, Jr.
BY
Hovey, Schmidt, Johnson & Hovey
ATTORNEYS.

United States Patent Office 3,045,950
Patented July 24, 1962

3,045,950
HELICOPTER CONTROL SYSTEM
Frank S. Jennings, Jr., 510 N. Delaware,
Independence, Mo.
Filed Feb. 1, 1961, Ser. No. 86,516
11 Claims. (Cl. 244—17.11)

This invention relates to aircraft and particularly to improved and simplified apparatus permitting the pilot to change the horizontal direction of a vertical ascent aircraft such as a helicopter or the like.

Aircraft which are capable of substantially vertical ascent and provided with one or more horizontal, rotatable rotors positioned above the fuselage of the body, normally have included internal control means adapted to shift the center of gravity relative to the center of lift of the rotor structure in order to permit selective change of the horizontal direction of movement of the aircraft. For example, in helicopters, prior apparatus has employed manually operable means for shifting the pilot's seat relative to the fuselage of the aircraft to thereby change the center of gravity with respect to the center of lift as defined by the axis of rotation of the rotors, whereby horizontal movement of the aircraft in any direction may be changed.

It is the primary object of this invention to provide simplified and inexpensive mechanism controllable by the operator of a helicopter, permitting selective change of the center of lift of the aircraft relative to the center of gravity, whereby the horizontal direction of movement of the aircraft may be changed in response to actuation of the manually operable control means.

An additional important object of the invention is to provide novel mechanism for operably coupling the rotor lift structure to the power operated drive means mounted within the helicopter and permitting horizontal shifting movement of the rotors with respect to the center of gravity of the helicopter without affecting normal rotation of the rotors, whereby the horizontal direction of movement of the machine may be varied at will.

An additional important object of the invention is to provide novel control apparatus for a helicopter as described above wherein change in direction of the aircraft forwardly or rearwardly as well as to the side may be effected by movement of a single control lever about a fixed point and with a minimum of effort being required.

A further important object of the invention is to provide a helicopter having improved directional control apparatus wherein the shaft or shafts rotatably carrying the lift rotors may be shifted in a plurality of directions horizontally with respect to the center of gravity of the machine, with the power operated drive means and the pilot's seat remaining in stationary positions so that the center of gravity does not vary as the horizontal direction of movement of the aircraft is changed.

Also an important object of the invention is to provide a helicopter having improved direction control apparatus which is especially adapted for utilization with a machine having a pair of rotors rotatable in opposite directions on a common shaft and including a rudder pivotally mounted at the rearmost end thereof in a position to receive air directed thereagainst from the rotors for facilitating control of the helicopter.

Additional important objects of the invention include details of the mechanism for operably interconnecting the lift rotors to the power drive means within the helicopter and which will be described in greater detail as the following specification progresses.

In the drawings:

FIG. 2 is a plan view of a part of the control apparatus with the shafts carrying the lift rotors being illustrated in section, and with certain parts of the structure being broken away to reveal details of construction thereof, the structure illustrated being located at the upper part of the helicopter fuselage as shown in FIG. 1;

FIG. 3 is a horizontal cross-sectional view taken on the line 3—3 of FIG. 1 and looking downwardly in the direction of the arrows, with alternate positions of certain of the components thereof being indicated by dotted lines;

FIG. 4 is a fragmentary, front elevational view of parts of the control apparatus illustrating the way in which the shiftable control stick is operably coupled to the mechanism shown in FIG. 2 in order to pivot the same about a fixed point to change the direction of the aircraft;

Figure 1:
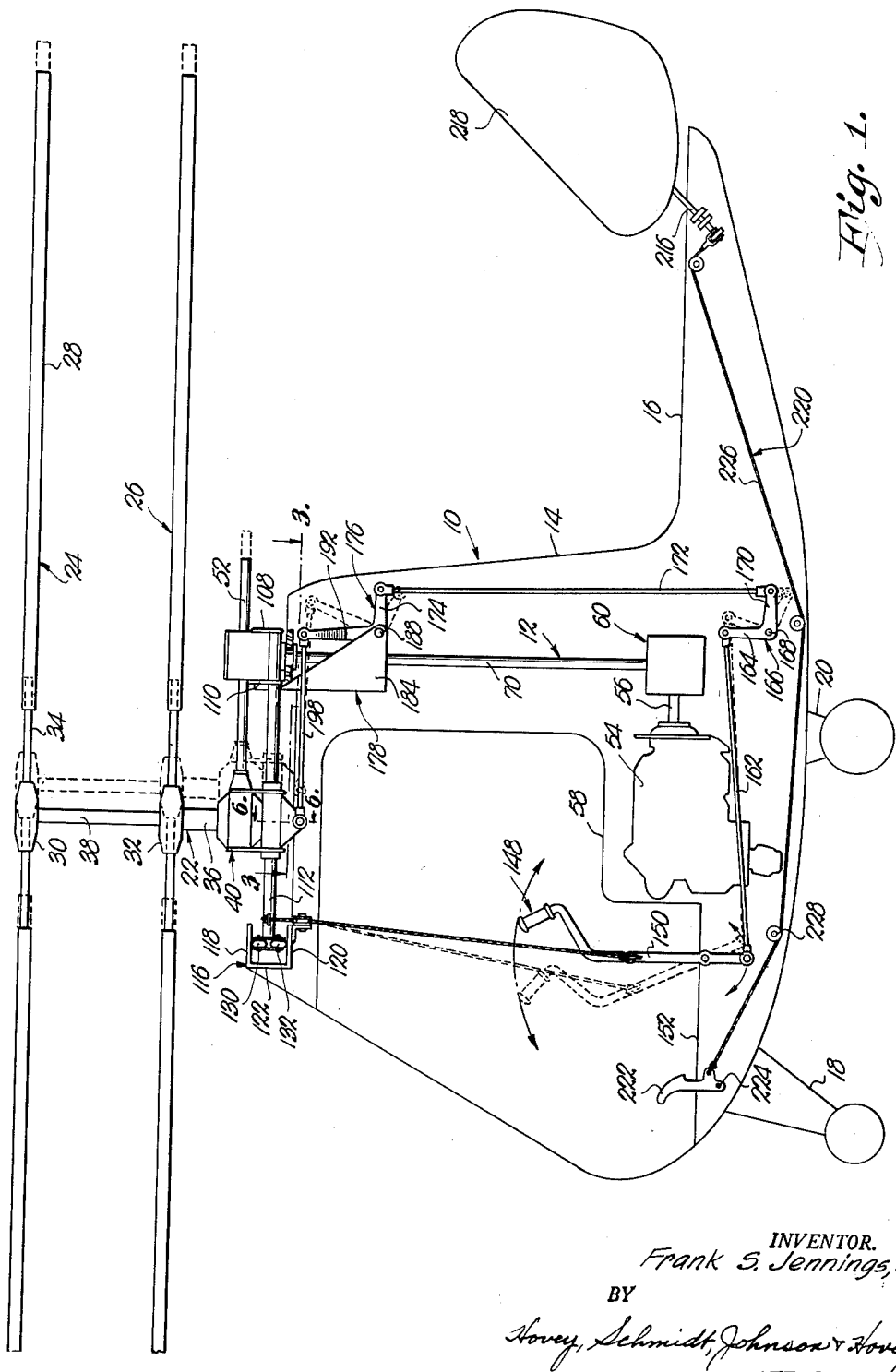
FIGURE 1 is a side elevational view of the directional control apparatus forming a part of the present invention for utilization on a helicopter which is shown schematically and adapted for shifting the center of lift on the machine relative to the center of gravity thereof, certain optional positions of the control elements being illustrated in dotted lines.

FIG. 5 is an enlarged, fragmentary, vertical cross-sectional view of a part of the apparatus operably coupling the power plant of the helicopter to the shaft means operably carrying the lift rotors, with certain portions of the components being broken away to reveal the internal construction thereof; and FIG. 6 is an enlarged, vertical cross-sectional view taken substantially on the line 6—6 of FIG. 1 and looking forwardly.

An aircraft in the nature of a helicopter broadly designated 10 is illustrated in FIG. 1 of the drawings and includes the novel control mechanism broadly numerated 12 embodying the preferred concepts of the present invention. As shown in FIG. 1, helicopter 10 includes a fuselage having a main cabin section 14, a tail boom 16 connected thereto and support means in the nature of single front landing gear 18 and a pair of aligned, horizontally spaced rear landing gear 20.

Lift means broadly designated 22 and forming a part of helicopter 10 preferably comprises a pair of parallel, vertically spaced rotor units 24 and 26 each of which includes an elongated blade 28 having a transverse airfoil configuration and connected to a respective central hub 30 and 32 in radially extending relationship thereto by corresponding, outwardly extending connector bars 34. Vertical sleeve 36 secured to hub 32 and depending therefrom, rotatably receives a drive shaft 38 coupled to hub 30 in a manner to maintain the latter in vertical spaced relationship to hub 32 as shown in FIG. 1.

The lower extremities of sleeve 36 and drive shaft 38 terminate within a first housing broadly designated 40 and positioned above the top of cabin section 14 of helicopter 10. First housing 40 includes a front wall 42, a rear wall 43 and a pair of opposed side walls 45 which define a circular opening at the upper ends thereof and which is closed by an annular cap 44 rotatably receiving sleeve 36, as shown in FIG. 5. Rear wall 43 also has a rearwardly disposed opening 46 communicating with a tubular, conical extension 48 welded to and extending from rear wall 43, sleeve 50 positioned within the tubular passage of extension 48 rotatably receiving a connector shaft 52 to be described in greater detail hereinafter.

It should be pointed out at this juncture that helicopter 10 has a power operated drive plant 54 in the nature of an internal combustion engine, preferably located substantially on the vertical center of gravity of helicopter 10 and provided with a rearwardly extending output shaft 56. It is to be preferred that the pilot's seat 58 of helicopter 10 positioned within cabin 14 be located directly above engine 54, as shown in FIG. 1.

Means for operably coupling output shaft 56 of engine 54 to drive shaft 38 and sleeve 36, includes a second housing located in substantially horizontal alignment with engine 54 rearwardly thereof in a position so that output shaft 56 may extend through an opening 62 in front wall 64 of housing 60. The top wall 66 of generally rectangular housing 60 has an opening 68 therein rotatably clearing an upright, elongated, rotatable connector shaft 70 having a bevel pinion 72 on the lower extremity thereof within housing 60 in operably meshing relationship with another bevel pinion 74 secured to output shaft 56 of power plant 54 and disposed within housing 60, as shown in FIG. 5.

Cabin 14 of helicopter 10 has a horizontal supporting wall 76 across the upper part thereof and provided with an opening 78 rotatably receiving a collar 80, it being noted that collar 80 has a central passage 82 therein rotatably receiving the upper extremity of shaft 70 as well as a circumferentially extending groove 84 which complementally receives the circular edge of wall 76 defining opening 78, and with groove 84 being located on the axis of passage 82 and thereby shaft 70.

Bevel pinion 86 secured to the upper extremity of shaft 70 above collar 80 is disposed within a third housing 88, it being perceived from FIG. 5 that the upper face of collar 80 is welded or otherwise secured to the lower wall 90 of housing 88. Opposed front and rear walls 92 and 94 of housing 88 have respective, horizontally aligned openings 96 and 98 therein adapted to clear shaft 52. One extremity of shaft 52 located within first housing 40 has a bevel pinion 100 secured thereto for rotation on the axis of shaft 52 and operably engageable with bevel pinions 102 and 104 secured to sleeve 36 and drive shaft 38 respectively. Rear wall 106 of housing 40 receives the lowermost end of shaft 38 with pinion 104 thereof being located in proximity to rear wall 106, while pinion 102 is adjacent upper cap 44 of housing 40. Thus, upon rotation of shaft 52 and thereby pinion 100, pinions 102 and 104 and thus sleeve 36 and shaft 38 are caused to rotate in opposite directions.

A pair of elongated, parallel, horizontally extending plates 108 and 110 suitably secured to the front wall 92 and rear wall 94 respectively of housing 88 receive the rear extremtiies of a pair of cylindrical bars 112 and 114 located on opposite sides of housing 88 as well as housing 40.

A horizontal channel broadly numerated 116 secured to the framework of cabin 14 with legs 118 and 120 of channel 116 located in horizontal disposition and the bight 122 interconnecting the same facing forwardly, receives roller structure broadly numerated 124 for supporting the forward extremities of bars 112 and 114. As shown in FIG. 2, structure 124 includes a pair of horizontal, parallel, elongated plates 126 and 128 which are secured to the proximal ends of bars 112 and 114 in horizontally spaced relationship and extending laterally from corresponding ends of the defined bars. A pair of vertically spaced rollers 130 and 132 located at opposite ends of plates 126 and 128 as well as intermediate bars 112 and 114, are disposed to rotatably engage the inner, opposed surfaces of legs 118 and 120 of channel 116. Since housing 88 is secured to collar 80 which is in turn rotatable on a vertical axis relative to wall 76, it can be perceived that bars 112 and 114 as well as plates 126 and 128 may rotate about the axis of shaft 70 as rollers 130 and 132 move on opposed faces of channel 116.

Means for slidably supporting housing 40 on bars 112 and 114 includes a pair of opposed, parallel, horizontally spaced plates 134 and 136 welded to opposite walls 42 and 45 of housing 40 and carrying sleeves 138 and 140 slidably receiving corresponding bars 114 and 112.

Shaft 52 is slidable relative to housing 88 as housing 40 is shifted toward and away the same and therefore, bevel pinion 142 slidably positioned on shaft 52 and operably engageable with pinion 86 has a centrally disposed key 144 parallel with and spaced from the axis of shaft 52. Shaft 52 is similarly provided with an elongated, longitudinally extending groove 146 therein which receives key 144 secured to pinion 142 within the central passage therethrough.

Manually operable control apparatus broadly numerated 148 for shifting housing 40 toward and away from housing 88 as well as about the axis of shaft 70, includes an upright, longitudinally irregular control stick 150 which is pivotally mounted on floor frame 152 of cabin 14 forwardly of the pilot's seat 58. As shown in FIG. 4, stick 150 has a ball 154 secured thereto adjacent but spaced from the lower extremity of stick 150 and which is freely rotatable in receptacle means broadly designated 156 and which includes a pair of opposed brackets 158 carried by floor frame 152 to permit swinging movement of stick 150 in any direction horizontally thereof. Clevis 160 secured to the lowermost end of stick 150 below floor frame 152 and thereby receptacle 156, pivotally receives one end of a link 162 which extends rearwardly beside power plant 54 and is pivotally joined to one arm 164 of a crank 166 which is pivotally mounted on the frame of cabin 14 by horizontal pivot pin 168. The opposite arm 170 of crank 166, which is at substantially a right angle with respect to arm 164, is pivotally joined to an elongated, upright link 172 which is swingably connected at the upper extremity thereof, to the arm 174 of a crank 176.

A transversely U-shaped bracket 178 includes a vertical bight portion 180 secured to a mounting plate 182 on the forward wall 92 of housing 88, while triangularly shaped, aligned legs 184 and 186 of bracket 178 receive shaft 70 as well as collar 80 therewithin. Pin means 188 secured to and spanning the distance between opposed lower extremities of legs 184 and 186 pivotally receives crank 176, as best shown in FIG. 1.

An elongated arm 190 secured to the uppermost extremity of leg 192 of crank 176 and disposed in perpendicular relationship to leg 192 is movable toward and away from shaft 70 in response to swinging movement of crank 176.

Triangularly-shaped mounting brackets 194 secured to the lower parts of sleeves 138 and 140 respectively in depending relationship thereto, each receive one end of a link or cable 196 and 198 coupling respective mounting brackets 194 to corresponding opposed ends of arm 190. Note should be taken of the fact that links 196 and 198 are pivotally joined to respective ends of arm 190 to permit the latter to swing about the longitudinal axis of links 196 and 198.

Means for shifting housing 40 through an arc about the axis of shaft 70, includes a pair of flexible cables 200 and 202 which couple stick 150 to roller structure 124, as best shown in FIG. 4. Note that stick 150 is provided with a pair of aligned, outwardly projecting ears 204 and 206 located above the axis of pivoting movement of stick 150 with one extremity of cable 200 being secured to ear 204 while an extremity of cable 202 is pivotally joined to ear 206.

The opposite extremity of cables 200 and 202 respectively are movably secured to respective connectors 208 and 210, in turn secured to and extending outwardly from plate 128 of roller structure 124 and disposed in horizontally spaced relationship. Pulleys 212 and 214 for each of the cables 200 and 202, are mounted on the framework of cabin 14 in a manner to maintain respective cables 200 and 202 in a taut condition so that roller structure 124 is shifted in channel 116 in response to pivoting of stick 150 toward and away from opposite sides of cabin 14.

An elongated rudder shaft 216 pivotally mounted on tail boom 16 adjacent the rearmost end thereof and extending upwardly at an angle with respect to the horizontal, mounts a planar rudder 218 positioned to receive currents of air from rotor units 24 and 26 respectively.

Mechanism broadly designated 220 is provided for rotating rudder 218 about the axis of shaft 216. Mechanism 220 includes a pair of foot actuated rudder pedals, one of which is shown in FIG. 1 forwardly of stick 150 and designated 222. Note that pedal 222 is pivotal about a pivot pin 224 carried by the framework of cabin 14, while a flexible cable 226 and passing over a number of pulleys 228 carried by helicopter 10, couples pedal 222 to shaft 216 for rotating the latter in one direction in response to swinging movement of rudder pedal 222. It is to be understood that depression of rudder pedal 222 rotates rudder 218 in one direction, while the other rudder pedal, not shown, rotates the rudder 218 in the opposite direction.

In operation, when stick 150 is in a vertical or "zero" position, upon actuation of power plant 54, shaft 56 is rotated to cause shaft 70 to be turned through intermeshing pinions 74 and 72. Power from shaft 70 is transmitted to shaft 52 through pinions 86 and 142 respectively, whereby pinions 102 and 104 are driven in opposite directions by pinion 100 secured to and rotatable with shaft 52. As pinions 102 and 104 are turned in opposite directions, sleeve 36 and drive shaft 38 are rotated therewith to in turn cause rotor units 24 and 26 to be rotated in opposite directions. As soon as the revolutions per minute of rotor units 24 and 26 have reached a predetermined rate, helicopter 10 will rise vertically under the control of the pilot who is actuating the throttle of power plant 54.

If it is desired that helicopter 10 move forwardly either in conjunction with continued ascent or without additional change in altitude, the pilot pushes stick 150 forwardly whereupon the latter pivots about ball 154, whereby the lowermost extremity of stick 150 shifts link 162 rearwardly to pivot bell crank 166 about the axis of pin 168. As arm 164 of crank 166 is moved rearwardly and arm 170 shifts downwardly a corresponding distance, link 172 is moved toward the lower part of helicopter 10 to pivot bell crank 176 about the axis of pin means 188. Downward movement of arm 174 and consequent shifting movement of leg 192 causes arm 190 to be shifted away from shaft 70 and toward the rear part of cabin 14 of helicopter 10, whereby links 196 and 198 pull respective mounting brackets 194 backwardly to in turn shift sleeves 138 and 140 and thus housing 40 toward housing 88. Shaft 52 shifts rearwardly within respective openings 96 and 98 whereby sleeve 36 and drive shaft 38, which are coaxial, are shafted rearwardly toward housing 88. It is to be understood that driving connection between shaft 70 and sleeve 36 as well as drive shaft 38 is maintained throughout shifting movement of housing 40 by virtue of the fact that sleeve 52 slides relative to pinion 142 with key 144 disposed in groove 146 serving to continue to impart rotational movement to shaft 52 from shaft 70, irrespective of longitudinal shifting movement of shaft 52.

It is to be pointed out that when stick 150 is in the neutral or zero position thereof, the axes of sleeve 36 and drive shaft 38 are coaxial with the vertical center of gravity of helicopter 10 when extends through the pilot seat 58 and power plant 54. Thus when the drive shaft 38 and sleeve 36 are shifted rearwardly to move the center of lift of rotor units 24 and 26 rearwardly of the vertical center of gravity of helicopter 10, the center of gravity is thus disposed forwardly of the center of lift and resulting in the helicopter moving forward.

If stick 150 is pulled backwardly to shift housing 40 and thereby rotor units 24 and 26 to a location with the axes thereof and thereby the center of lift forwardly of the vertical center of gravity of helicopter 10, the latter is caused to move rearwardly.

By the same token, swinging of stick 150 about ball 154 either to the left or right causes roller structure 124 to be shifted in channel 116 by virtue of cables 200 and 202 connected directly to forward plate 128. Viewing FIG. 4, which is looking toward the rear of helicopter 10, it can be seen that movement of stick 150 to the right causes roller structure 124 to be moved to the left within channel 116, thereby causing housing 40 to be moved in an arcuate path of travel about an axis through drive shaft 70. It is to be noted that when the control stick is moved to the left looking toward the forward part of the helicopter, housing 40 and thereby the center of lift of rotor units 24 and 26 is moved to the right, leaving the center of gravity of helicopter 10 to the left of the center of lift whereby the resultant directional flight is to the left. An opposite directional effect takes place when control stick 150 is moved in the opposite direction and thus to the right.

Rudder 218 is provided at the rear part of tail boom 16 in order to increase the directional stability of helicopter 10. Rudder shaft or post 216 is mounted at a 45° angle with respect to the horizontal so that when shaft 216 is turned about the axis thereof, rudder 218 will increase the stability of helicopter 10 not only because of air passing by the same during movement of helicopter 10 in respective horizontal directions, but also because of air forced thereagainst from oppositely rotating rotor units 24 and 26.

By virtue of the construction illustrated and described in detail above, it can be perceived that helicopter 10 may be produced at a relatively low cost, a minimum amount of maintenance is required, and stability is afforded which is not present in current production models. Although the preferred embodiment of the control apparatus has been shown and described, it is to be understood that various changes in the actual structure may be made without departing from the spirit of the invention and it is therefore intended to be limited only by the scope of the appended claims.

Having thus described the invention what is claimed as new and desired to be secured by Letters Patent is:

1. A helicopter having lifting means, power operated driving means and a vertical center of gravity through the helicopter, the improvement of which comprises a vertical drive shaft adapted to be mounted on the helicopter in a position operably carrying said lifting means and having a first pinion thereon; a collar adapted to be mounted on said helicopter, and provided with a vertical passage therethrough; a second shaft rotatably mounted within the passage of said collar and provided with a second pinion thereon; means operably coupling said power operated driving means to said second shaft; means operably coupling said second shaft to said vertical drive shaft and including a third shaft having a third pinion thereon operably meshing with said first pinion, said third shaft having a fourth pinion thereon operably engaging said second pinion, there being means for permitting reciprocation of said third shaft relative to said fourth pinion while the latter is maintained in operable engagement with said second pinion and said third shaft is rotated in respons to the rotation of said fourth pinion; and manually operable means coupled with said drive shaft for permitting selective shifting movement of the latter and thereby said shaft with respect to the second shaft and thereby the center of gravity of the helicopter whereby the horizontal direction of movement of the latter may be changed in response to actuation of said manually operable means.

2. A helicopter as set forth in claim 1 wherein is provided means for mounting the drive shaft, the third shaft and the pinions thereon for rotation about the axis of said second shaft.

3. A helicopter as set forth in claim 2 wherein is provided control structure adapted to be mounted within the helicopter and operably coupled with said drive shaft for shifting the latter toward and away from said second shaft and through an arc about the axis of said second shaft upon actuation of said control structure.

4. A helicopter as set forth in claim 3 wherein said control structure includes an upright stick adapted to be pivotally mounted on the helicopter, there being control linkage connecting the stick to the drive shaft for shifting the latter toward and away from the second shaft and additionally through an arc relative thereto in response to and in the same direction of pivoting movement of said stick.

5. In a helicopter having lifting means, power operated driving means and a vertical center of gravity through the helicopter, the improvement of which comprises a vertical drive shaft adapted to be mounted on the helicopter in a position operably carrying said lifting means; first pinion means connected to the lowermost extremity of said drive shaft, a first housing rotatably receiving the lower end of said drive shaft and the first pinion thereon; a pair of parallel bars adapted to be mounted on said helicopter in a horizontal position; sleeves secured to said first housing and slidably disposed on respective bars for normally horizontal reciprocation relative thereto; a collar adapted to be mounted on said helicopter for rotation about a vertical axis and having a vertical passage therethrough; a second shaft rotatably mounted in said passage of the collar; means adapted for operably coupling the lowermost extremity of said second shaft to said power operated driving means; second pinion means secured to the upper extremity of said second shaft for rotation therewith; a housing secured to said collar for rotation therewith and receiving the upper end of said second shaft and the second pinion means secured thereto; a third shaft rotatably carried by said first and second housings respectively and having a third pinion secured to the end thereof within said first housing and operably meshing with said first pinion means on the drive shaft; fourth pinion means reciprocably mounted on said third shaft and operably meshing with said third pinion means, said fourth pinion means and the third shaft having structure thereon permitting free reciprocation of the fourth pinion means relative to the third shaft and preventing rotation of the third shaft relative to the fourth pinion means; and control means adapted to be pivotally mounted on the helicopter and including linkage coupled to said first housing for shifting the latter toward and away from said second housing as the collar slides on said bars, and for pivoting the first housing about the axis of said second shaft as said collar and thereby the second housing secured thereto rotates about said second shaft.

6. A helicopter as set forth in claim 5 wherein is provided a channel member adapted to be mounted on the helicopter in a normally horizontal position remote from said second housing with the first housing between the channel and said second housing, the open side of said channel facing said second housing, there being roller means mounted on the forward extremities of said bars disposed within said channel to permit free pivoting movement of the bars and thereby said second housing about the axis of rotation of said collar and thereby the second housing.

7. A helicopter as set forth in claim 6 wherein the control means includes a stick adapted to be pivotally mounted on the helicopter and pulley and cable means operably interconnecting the stick and the roller means for pivoting the latter and thereby said first bars and the first housing about the axis of said collar in response to swinging of said control stick.

8. A helicopter as set forth in claim 5 wherein is provided link and crank means adapted to be mounted on the helicopter and operably coupled to said first housing for shifting the latter toward and away from said second housing in response to swinging movement of said control stick.

9. A helicopter as set forth in claim 5 wherein said lifting means comprises a pair of blade units and wherein is included a pair of drive shafts disposed in telescoped relationship, rotatable relative to each other and adapted to be operably coupled to corresponding blade units, there being means operably connecting said third drive shaft to said pair of drive shafts for rotating the latter in opposite directions and irrespective of shifting movement of said first housing toward and away from said second housing or in an arc about the axis of said collar.

10. A helicopter as set forth in claim 9 wherein is provided planar rudder means adapted to be pivotally mounted on the helicopter rearwardly of said second shaft and disposed to receive currents of air produced by said blade units during rotation thereof.

11. A helicopter as set forth in claim 10 wherein is included control structure operably coupled to said rudder means and adapted to be mounted on the helicopter in a position to be actuated by the operator in conjunction with swinging of said control stick.

References Cited in the file of this patent

UNITED STATES PATENTS

| | | |
|---|---|---|
| 2,418,407 | Hays | Apr. 1, 1947 |
| 2,532,683 | Traver | Dec. 5, 1950 |
| 2,638,863 | Kiebler | May 19, 1953 |
| 2,755,765 | Wanzer | July 24, 1956 |